United States Patent [19]

Morimoto et al.

[11] Patent Number: 4,862,328

[45] Date of Patent: Aug. 29, 1989

[54] ELECTRIC DOUBLE LAYER CAPACITOR

[75] Inventors: Takeshi Morimoto; Yasuhiro Sanada; Shinichi Ohashi; Yoshikatsu Kimura, all of Yokohama, Japan

[73] Assignees: Asahi Glass Company Ltd., Tokyo; Elna Company Ltd., Fujisawa, both of Japan

[21] Appl. No.: 177,854

[22] Filed: Mar. 28, 1988

Related U.S. Application Data

[63] Continuation of Ser. No. 895,388, Aug. 11, 1986, abandoned.

[30] Foreign Application Priority Data

Aug. 13, 1985 [JP] Japan .................... 60-176855
Jun. 6, 1986 [JP] Japan .................... 61-130391

[51] Int. Cl.$^4$ ............................... H01G 9/02
[52] U.S. Cl. .................... 361/502; 29/570.1; 252/62.2; 264/41; 264/49; 264/105; 264/127; 264/288.8; 429/162
[58] Field of Search .......... 264/41, 49, 105, 127, 264/288.8; 29/570.1; 204/418; 252/62.2; 307/109; 361/433 C, 433 M; 429/128, 145, 162, 212, 254

[56] References Cited

U.S. PATENT DOCUMENTS

| | | | |
|---|---|---|---|
| 3,615,841 | 10/1971 | Smith et al. | 264/127 X |
| 4,248,924 | 2/1981 | Okita | 264/288.8 X |
| 4,317,789 | 3/1982 | Groult et al. | 264/105 |
| 4,327,400 | 4/1982 | Muranaka et al. | 361/433 M |
| 4,382,875 | 5/1983 | Solomon | 264/105 X |
| 4,397,907 | 8/1983 | Rosser et al. | 264/22 X |
| 4,405,544 | 9/1983 | Solomon | 264/127 |
| 4,438,481 | 3/1984 | Phillips et al. | 361/433 M |
| 4,556,618 | 12/1985 | Shia | 264/41 X |
| 4,562,511 | 12/1985 | Nishino et al. | 361/433 M X |
| 4,576,861 | 3/1986 | Kato | 264/127 X |
| 4,597,028 | 6/1986 | Yoshida et al. | 361/433 M X |
| 4,659,528 | 4/1987 | Plowman et al. | 264/49 |
| 4,725,926 | 2/1988 | Morimoto et al. | 361/433 M |
| 4,725,927 | 2/1988 | Morimoto et al. | 361/433 M |
| 4,757,424 | 7/1988 | Morimoto et al. | 361/433 M |

FOREIGN PATENT DOCUMENTS

| | | | |
|---|---|---|---|
| 113869 | 7/1984 | European Pat. Off. | 264/127 |
| 134706 | 3/1985 | European Pat. Off. | |
| 3000777 | 7/1980 | Fed. Rep. of Germany | |
| 51-77674 | 7/1976 | Japan | 264/127 |
| 55-108425 | 8/1980 | Japan | 264/127 |
| 58-166021 | 10/1983 | Japan | 264/105 |
| 59-196224 | 11/1984 | Japan | 264/105 |

Primary Examiner—Jeffery Thurlow
Assistant Examiner—Leo B. Tentoni
Attorney, Agent, or Firm—Oblon, Fisher, Spivak, McClelland & Maier

[57] ABSTRACT

A polarizable electrode for an electric double layer capacitor, composed of a continuously micro-porous strucutre of a fluorine-containing polymer resin with a fine carbon powder incorporated therein, wherein said structure includes a numerous fine nodes of the resin and fine fibers of the resin three dimensionally connecting the nodes so that the nodes are partially in contact with or connected to one another, and the fine carbon powder is contained substantially in the nodes.

5 Claims, 1 Drawing Sheet

ELECTRIC DOUBLE LAYER CAPACITOR

BACKGROUND OF THE INVENTION

The present invention relates to a polarizable electrode for an electric double layer capacitor, a process for its production, and an electric double layer capacitor wherein such polarizable electrodes are employed.

In recent years, the demand has rapidly increased for an electric double layer capacitor, particularly for a coin-shaped (or button-shaped) cell, as disclosed in European Patent No. 134706, comprising an electric double layer formed by polarizable electrodes and an electrolyte interface, as a miniature capacitor having a large capacity or as a memory back-up electric power source.

As an electrode for such an electric double layer capacitor, there has been known an electrode prepared by kneading an activated carbon powder with an electrolyte such as sulfuric acid to form a slurry, followed by press-molding (U.S. Pat. No. 3,288,641). However, such an electrode has a rigid porous structure and is susceptible to cracking or breakage, and thus hardly durable for use for a long period of time.

In order to improve the crack or breakage resistance, a carbon paste electrode has been proposed which is made of a mixture comprising an activated carbon powder and an electrolyte in an amount sufficient to provide a viscosity of a paste, and if necessary a polytetrafluoroethylene binder (Japanese Examined Patent Publication No. 7025/1978 or No. 41015/1980). Such a carbon paste electrode is flexible and has anti-cracking or breakage properties. However, its dimensional stability i.e. the shape-maintaining property is poor, and for its use, it is required to employ a cell having a special structure in order to reinforce the strength.

Further, an electrode having high mechanical strength has been proposed wherein activated carbon fibers are used as carbon material (European Patent No. 134706). However, activated carbon fibers have not only a smaller specific surface area than the carbon powder but also a large void volume, whereby a void volume loss is substantial. This is problematic particularly when a volume as small as possible is required for a predetermined capacity. In order to overcome this problem, an electrode has been proposed wherein pulverized activated fibers or a special binder is used (Japanese Unexamined Patent Publication No. 26207/1986 or No. 26208/1986). However, in this case, the improvement in the specific surface area is not yet adequate, and the mechanical strength of the activated carbon fibers tends to be impaired. Thus, such a proposal is not necessarily advantageous.

SUMMARY OF THE INVENTION

It is an object of the present invention to solve the above-mentioned conventional problems and to provide a polarizable electrode for an electric double layer capacitor, particularly, for a capacitor of a coin-shaped structure, having a small volume for the predetermined capacity of the capacitor and having excellent mechanical properties including high resistance to cracking or breakage and high dimensional stability, and to provide a process for the production of such an electrode.

More particularly, it is an object of the present invention to provide a polarizable electrode for an electric double layer capacitor having a capacity as large as e.g. at least 40 $F/cm^3$ as the capacity per volume of the capacitor ($F/cm^3$) and to provide a process for producing such an electrode.

The polarizable electrode for an electric double layer capacitor according to the present invention is produced by a process which comprises molding a mixture comprising a fine carbon powder, a fluorine-containing polymer resin and a liquid lubricant, into a sheet, then removing the liquid lubricant from the molded product, and subjecting the molded product to mono- or multi-axial stretching, and, if necessary, subjecting the stretched product to sintering treatment.

A preferred polarizable electrode of the present invention produced by such a process, is composed of a continuously micro-porous structure of a fluorine-containing polymer resin with a fine carbon powder incorporated therein, wherein said structure comprises a numerous fine nodes of the resin and fine fibers of the resin three dimensionally connecting the nodes so that the nodes are partially in contact with or connected to one another, and the fine carbon powder is contained substantially in the nodes.

The present invention also provides a coin-shaped electric double layer capacitor comprising an assembly of a pair of sheet-shaped polarizable electrodes and a separator interposed between the electrodes and impregnated with an electrolyte, a metal casing accommodating the assembly and electrically connected at its bottom to one of the polarizable electrodes, a metal cover for the metal casing, connected to the other electrode, and a sealing material interposed between and electrically insulating the periphery of the metal cover and the open edge of the metal casing and integrally caulked by the open edge of the metal casing, wherein the polarizable electrodes are composed of the above-mentioned porous structure of a fluorine-containing polymer resin with a fine carbon powder incorporated therein.

Now, the present invention will be described in detail with reference to the preferred embodiments.

BRIEF DESCRIPTION OF THE DRAWINGS

In the accompanying drawings.

DETAILED DESCRIPTION OF THE INVENTION

Figure 1:
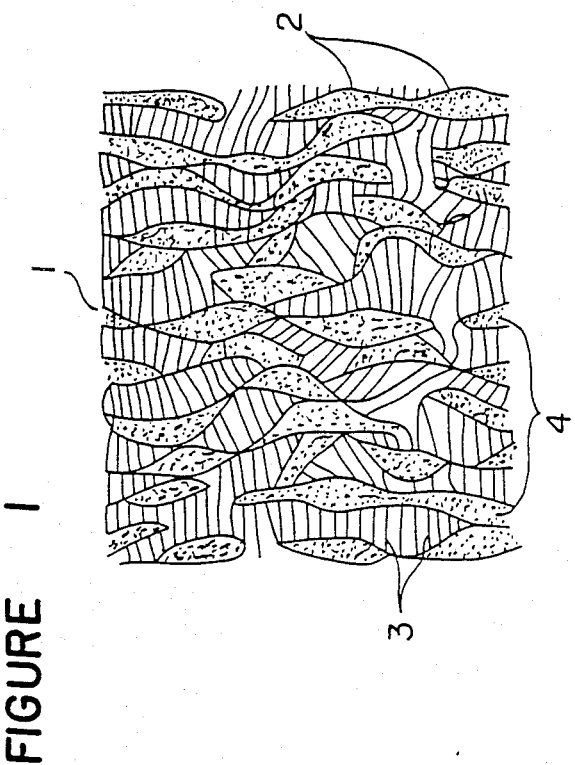
FIG. 1 is an enlarged diagrammatical plan view of a typical example of a preferred polarizable electrode of the present invention.

The polarizable electrode of the present invention preferably has the above-mentioned porous structure. An enlarged diagrammatical plan view of a typical representative of such a structure is shown in FIG. 1. In the polarizable electrode 1 of FIG. 1, the fine carbon powder 4 is contained substantially in its entirety in the fine nodes 2. Fine nodes 2 are three dimensionally connected to one another by fine fibers 3 so that the nodes are partially in contact with or connected to one another. Since the fine nodes 2 are in contact with or connected to one another by the fine fibers 3, the fine carbon powder 4 contained in the fine nodes 2, is densely contained by the porous structure so that a large capacity is provided to the capacitor, and at the same time, high mechanical strength with proper flexibility will be given to the porous structure by the presence of the fine fibers.

The continuously micro-porous structure preferably has an apparent specific gravity of from 0.3 to 0.9 g/cm$^3$, preferably from 0.4 to 0.7 g/cm$^3$, a maximum pore size of from 0.1 to 20 μm, more preferably from 1 to 10 μm, and a Gurley number (seconds) of from 5 to 2000, more preferably from 100 to 1500. Here, the Gurley number (seconds) represents a time for an air of 100 cc to permeate through the cross-section of a material having a diameter of 2.54 cm under a pressure of 12.7 H$_2$O. Further, the above-mentioned porous structure has a matrix tensile strength of at least 0.01 kg/mm$^2$, preferably at least 0.02 kg/mm$^2$. As the fine carbon powder contained in the continuously micro-porous structure in the present invention, an activated carbon, carbon black or a mixture thereof may be employed in present invention. As the activated carbon, there may be employed activated carbon of a phenol type, a rayon type, an acrylic type, a pitch type or a coconut shell type. As the fine carbon powder, it is possible to employ the one having preferably a particle size of from 0.1 to 200 μm, more preferably from 1 to 50 μm. The specific surface area is preferably from 1500 to 3500 m$^2$/g, more preferably from 2000 to 3000 m$^2$/g. In the present invention, when a fine carbon powder is employed, a high capacity will be obtained for the same specific surface area as compared with activated carbon fibers, and therefore the use of a fine carbon powder is preferred.

However, it is possible to employ, for instance, pulverized carbon fibers having a length of from 0.1 to 200 μm, preferably from 1 to 50 μm, as the case requires.

As the fluorine-containing polymer resin which constitutes the continuously micro-porous structure, any resin may be employed so long as it is capable of forming the above-mentioned structure. Preferably, a resin of a fluorine-containing polymer such as polytetrafluoroethylene (PTFE), an ethylene-tetrafluoroethylene copolymer, a chlorotrifluoroethyl-ethylene polymer, a vinylidene fluoride copolymer or a tetrafluoroethyleneperfluoroalkylvinyl ether copolymer, may be employed. It is particularly preferred to use the PTFE resin since it has good heat resistance and chemical resistance.

The polarizable electrode of the present invention may be prepared by the following process including a mono- or multi-axial stretching operation of a sheet product.

(1) For instance, a viscous mixture composed essentially of a PTFE powder as the resin, a fine carbon powder and a liquid lubricant, is prepared. As the liquid lubricant, there may be employed various lubricants e.g. water, an alcohol, a petroleum, a liquid hydrocarbon such as solvent naphtha or white oil, or various other lubricants disclosed in Japanese Examined Patent Publications No. 14178/1967, No. 44664/1973 and No. 18991/1976.

The viscous mixture is prepared by a suitable means by using from 1 to 50% by weight, preferably from 5 to 30% by weight, of PTFE and from 20 to 200% by weight, preferably from 50 to 150% by weight, of the liquid lubricant, relative to the fine carbon powder. For instance, the fine carbon powder is added to the PTFE dispersion, followed by stirring to coagulate the fine carbon powder on PTFE particles, and then the liquid lubricant is added and mixed.

The mixture may also be prepared by uniformly mixing a fine PTFE powder and the fine carbon powder in a rotary mixer, and then a liquid lubricant is added to the mixture. Further, it may be prepared by adding a mixture of the fine carbon powder and the liquid lubricant, to a PTFE powder preliminarily charged in a blender.

(2) The viscous mixture is molded into an electrode of e.g. a sheet form by compression, extrusion, rolling or a combination thereof.

(3) The liquid lubricant is removed from the molded product by a suitable means such as heating or extraction. Then, the molded product is mono- or multi-axially stretched. The stretching may be conducted by a known method (such as Japanese Unexamined Patent Publication No. 166541/1984) preferably at a temperature of from 20° to 380° C., more preferably from room temperature to 200° C., preferably from 1.1 to 5.0 times the original dimension (length).

(4) The stretched product may be per se used as a polarizable electrode. However, the stretched product may further be subjected to rolling or compression treatment by rolls or press, or to sintering (including incomplete sintering). The complete sintering is conducted at a temperature higher than the melting point of the PTFE, and the incomplete sintering is conducted at a temperature of not higher than the melting point of PTFE.

The pore size in the porous structure of a non-sintered product is more uniform than that in a completely sintered product. Whereas, the completely sintered product is superior to the non-sintered product in the mechanical strength and conductivity. The rolling or compression treatment may be conducted after the sintering treatment, and may be conducted in a number of times before or after the sintering.

In the above process, the stretching treatment in step (3) is particularly important. By conducting such stretching treatment, it is possible to obtain a porous product having the above-mentioned structure wherein a fine carbon powder is contained in fine nodes, and the fine nodes are three-dimensionally connected to one another by fine fibers so that the nodes are partially in contact with or connected to one another. If no stretching treatment is conducted, the mechanical strength will be inferior, and the fine carbon powder is likely to fall off, whereby there will be a problem such as a deterioration of the capacity, and the product will be unsuitable for practical use. This is not suitable particularly in the case of a capacitor having a coin-shaped structure which is small in size and which is required to have high mechanical strength such as impact resistance.

There is no particular restriction as to the electrolyte to be used in combination with the polarizable electrode of the present invention. Various conventional types of electrolytes may be employed. As such an electrolyte, there may be mentioned the one prepared by dissolving from 0.5 to 1.5 M of a solute such as an alkali metal salt, an amine salt or a tetraalkyl ammonium or tetraalkyl phosphonium salt (the counter anion includes a perchloric acid ion, a phosphorus hexafluoride ion, a perfluoroalkylsulfonic acid ion and a boron tetrafluoride ion) in a solvent such as propylene carbonate, γ-butyrolactone, acetonitrile, butylene carbonate dimethylformamide, 1,2-dimethoxyethane, sulfolane, nitromethane, or a mixture thereof.

An electric double layer capacitor can be obtained by sandwiching a porous separator between a pair of electrodes obtained by shaping the above-mentioned sheet products to correspond to the shape of the capacitor, impregnating or filling the above-mentioned electrolyte to the sandwiched assembly, sealing the assembly in a casing.

As the porous separator, for instance, a polypropylene non-woven fabric or a glass fiber-incorporated cloth, may be used. The separator usually has a thickness of from 50 to 200 μm, preferably from 100 to 150 μm.

Figure 2:
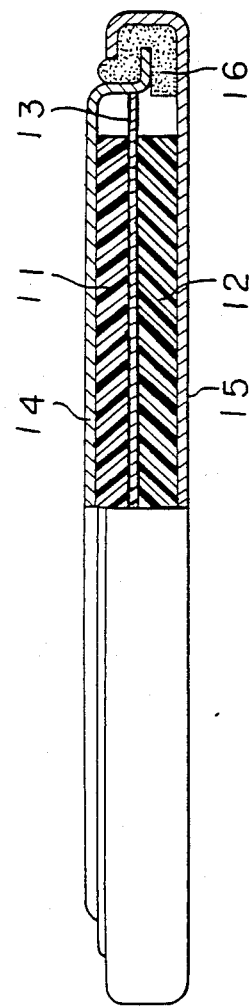
FIG. 2 is a partially cross-sectional view of an electric double layer capacitor as an embodiment of the present invention.

The polarizable electrode of the present invention is useful for electric double layer capacitors of both types of a spiral structure and a coin-shaped structure. The spiral structure (as shown in FIG. 2 of European Patent No. 134706) may be prepared by rolling a metal net current collector and the polarizable electrode of the present invention to form a polarizable electrode, sandwiching the above-mentioned separator impregnated with the above-mentioned electrolyte by a pair of the polarizable electrodes, coiling the polarizable electrode together with the separator to form an assembly of a spiral structure wherein the polarizable electrodes face to each other with the separator interposed therebetween, and placing the assembly in a casing.

The coin-shaped structure (as shown in FIG. 4 of European Patent No. 134706) comprises an assembly of a pair of sheet-shaped polarizable electrodes and a separator interposed between the electrodes and impregnated with the above-mentioned electrolyte, a metal casing accommodating the assembly and electrically connected at its bottom to one of the polarizable electrodes, a metal cover for the metal casing, connected to the other electrode, and a sealing material interposed between and electrically insulating the periphery of the metal cover and the open edge of the metal casing and integrally caulked by the open edge of the metal casing. The electrical contact between the metal cover and the polarizable electrode or between the metal casing and the polarizable electrode, is conducted by a suitable current collector such as a metal net or a conductive resin.

The polarizable electrode of the present invention is useful particularly for an electric double layer capacitor having the coin-shaped structure, because the coin-shaped cell is required to be small in size and yet to have a large capacity per prescribed volume and high mechanical strength particularly against cracking and breakage so that the cell is useful for portable-type electric devices (such as clocks, watches, televisions or video tape recorders, etc.). The polarizable electrode of the present invention is also useful for a carbon-lithium secondary battery as well.

Now, the present invention will be described in further detail with reference to Examples. However, it should be understood that the present invention is by no means restricted to these specific Examples.

EXAMPLE 1

To a powder mixture comprising 70% by weight of activated carbon having a specific surface area of 3000 $m^2/g$, 20% by weight of carbon black and 10% by weight of a PTFE powder (particle size: 0.3 μm), water was added in an amount of 200% by weight. The mixture was charged into a V-shape blender and mixed. The paste-like mixture discharged, was molded by a roll molding machine into a sheet having a thickness of 1.1 mm. The sheet was preheated to 300° C. and mono-axially stretched 1.1 times to obtain a sheet-shaped electrode having a thickness of 0.6 mm.

By using this sheet product, the capacity per unit volume of the electrode and the dependability at a high temperature for a long period of time were evaluated in the following manner.

In each of the Example of the present invention and the Comparative Example, a unit cell (diameter: 20 mm, thickness: 2.0 mm) of a coin-shaped electric double layer capacitor as shown in FIG. 2 was prepared as follows.

Firstly, the sheet product was punched out to obtain a disc-shaped polarizable electrode 11 (diameter: 15 mm, thickness: 0.6 mm) and a polarizable electrode 12 having the same composition and shape as the electrode 11. These electrodes and a separator 13 made of a non-woven fabric of polypropylene interposed therebetween, were placed in a container comprising a stainless steel cap 14 and a stainless steel can 15 and integrated with an insulating packing made of polypropylene, and then caulked for sealing. The electrodes 11 and 12 were electrically connected to a stainless steel caps 14 and a stainless steel can 15 respectively, preferably with the aid of electro-conductive adhesives as disclosed in Japanese Unexamined Patent Publication No. 3915/1984. Prior to the sealing, a prescribed electrolyte (a propylene carbonate solution of 1M tetraethylammonium trifluoromethane sulfonate) was injected to adequately impregnate the polarizable electrodes 11 and 12 and the separator 13 with the electrolyte.

The electric double layer capacitor unit cell thus prepared, was charged at a constant voltage of 2.8 V for 30 minutes, and then discharged at a constant-current of 1 mA, whereby the time until the terminal voltage became 0 V during the discharging was measured, and the initial capacity was calculated.

Then, the capacity after the same cell was continuously charged with 2.8 V at 70° C. for 1000 hours, was measured in the same manner, whereupon the initial values were compared to obtain a deterioration rate.

EXAMPLE 2

In Example 1, the sheet product obtained by rolling was biaxially stretched 1.2 times at 200° C. to obtain a sheet. The operation was conducted in the same manner as in Example 1 except that the sheet thus obtained was employed.

EXAMPLE 3

In Example 1, the sheet product obtained by rolling was held in an atmosphere of 150° C. to evaporate water. The operation was conducted in the same manner as in Example 1 except that the following three types of sheet-shaped electrodes were employed:

(3-1) the above sheet was mono-axially stretched 2 times in an atmosphere of 300° C., (3-2) the sheet obtained in (3-1) was held in an atmosphere of 310° C. for 5 minutes with both ends fixed, and (3-3) the sheet obtained in (3-1) was held in an atmosphere of 360° C. for 5 minutes with both ends fixed.

COMPARATIVE EXAMPLE 1

In Example 1, the sheet product obtained by rolling, was molded by a roll molding machine into a thickness of 0.6 mm, and an electrode was prepared by evaporating moisture in an atmosphere of 150° C. The operation was conducted in the same manner as in Example 1 except that the electrode thus prepared was employed.

COMPARATIVE EXAMPLE 2

The operation was conducted in the same manner as in Example 1 except that an electrode made of a non-woven fabric (specific surface area: 2000 m²/g, thickness: 0.6 mm) of a phenol-type activated carbon fiber, was employed.

The physical property values of the sheet products and the measured values are shown in Table 1.

TABLE 1

| | Apparent specific gravity (g/cm³) | Void volume (%) | Gurley number (sec) | Maximum pore size (μm) | Initial capacity (F/cm³) | Deterioration rate of the capacity upon expiration of 1000 hours at 70° C. at 218 V (%) |
|---|---|---|---|---|---|---|
| Example 1 | 0.52 | 80 | 960 | 2.02 | 43.8 | 3.5 |
| Example 2 | 0.51 | 81 | 790 | 2.21 | 44.3 | 2.8 |
| Example 3-1 | 0.60 | 75 | 1300 | 1.92 | 44.1 | 2.5 |
| Example 3-2 | 0.54 | 84 | 800 | 2.22 | 41.5 | 2.9 |
| Example 3-3 | 0.56 | 78 | 820 | 2.41 | 41.9 | 4.2 |
| Comparative Example 1 | 0.39 | 86 | 520 | 5.49 | 35.5 | 21.2 |
| Comparative Example 2 | 0.32 | 88 | — | — | 32.8 | 30.9 |

COMPARATIVE EXAMPLE 3

To an activated carbon having a specific surface area of 2000 m²/g (coconut shell type, specific surface area: 2000 m²/g, bulk density: 0.33 g/ml, total pore volume: 0.96 ml/g), 10% by weight of a tetrafluoroethylene powder (particle size: 0.3 μm) and 2% by weight of ethanol, were added, and the mixture was kneaded in a mortar to form a paste. This paste was molded into a sheet product having a thickness of 0.7 mm by a roll molding machine. The capacity per unit volume of the electrode was obtained in the following manner by using this sheet product.

Firstly, in an internally threaded cylindrical nickel container having a bottom, a cathode side sheet-shaped electrode to be tested (3.14 cm², 0.7 mm in thickness), a separator made of a non-woven fabric of polypropylene (4.9 cm², 0.4 mm in thickness) and an anode side sheet-shaped electrode to be tested (3.14 cm², 0.7 mm in thickness) each impregnated with an electrolyte, were overlaid one after another. In this case, the sheet-shaped electrodes were arranged to face each other with the separator interposed therebetween.

Then, an externally and internally threaded ring of polytetrafluoroethylene was screwed in this container to fix the positions of the electrodes and the separator.

Then, a threaded rod of polytetrafluoroethylene having provided at the forward end with a platinum net current collector (200 mesh) having a platinum lead wire, was screwed in the opening of the above-mentioned ring. The assembling was completed by confirming the electric connection of the platinum lead wire and the nickel container by a LCR meter AC two-terminal method. The platinum lead wire was led out through a hole provided at the center of the above-mentioned rod.

As the electrolyte, a 1M tetraethylammonium perchlorate-propylene carbonate was employed. After the separator and the sheet-shaped electrodes impregnated with this electrolyte were set in the container, charging was conducted at a constant voltage of 1.8 V for 1 hour. Then, discharging was conducted at a constant current of 1 mA, whereby the time until the terminal voltage during the discharging became 0 V was measured, and the capacity was calculated from the measured value.

EXAMPLE 4

In Comparative Example 3, the sheet product obtained was biaxially stretched 1.2 times at 200° C. to obtain a sheet. The operation was conducted in the same manner as in Comparative Example 3 except that the sheet thus obtained was employed.

EXAMPLE 5

The operation was conducted in the same manner as in Comparative Example 3 except that an activated carbon having a specific surface area of 2500 m²/g, a bulk density of 0.31 g/ml and a total pore volume of 0.98 ml/g (petroleum coke-type, manufactured by Anderson Co.) was used instead of the activated carbon used in Comparative Example 3.

EXAMPLE 6

The operation was conducted in the same manner as in Comparative Example 3 except that an activated carbon having a specific surface area of 3000 m²/g, a bulk density of 0.31 g/ml and a total pore volume of 0.98 ml/g (petroleum caulks-type) was used instead of the activated carbon used in Comparative Example 3.

EXAMPLE 7

The operation was conducted in the same manner as in Comparative Example 3 except that an activated carbon having a specific surface area of 3500 m²/g, a bulk density of 0.30 g/ml and a total pore volume of 0.98 ml/g (petroleum coke-type) was used instead of the activated carbon used in Comparative Example 3.

COMPARATIVE EXAMPLE 4

The same experiment as in Comparative Example 3 was conducted by using an electrode (specific surface area: 2000 m²/g) made of a phenol-type activated carbon fiber.

The results of the above experiments are as shown in Table 2.

TABLE 2

| | Capacity (F/cm³) |
|---|---|
| Comparative Example 3 | 42.0 |
| Example 4 | 42.5 |
| Example 5 | 43.0 |
| Example 6 | 45.0 |
| Example 7 | 45.1 |
| Comparative Example 4 | 37.8 |

It is evident from the results of Table 1 that by using continuously porous stretched sheet-shaped electrodes of the present invention, it is possible to prepare electric double layer capacitors having excellent mechanical properties and a large capacity per unit volume, as compared with the conventional activated carbon electrodes.

We claim:

1. A coin-shaped electric double layer capacitor comprising an assembly of a pair of sheet-shaped polarizable electrodes and a separator interposed between the electrodes and impregnated with an electrolyte, a metal casing accommodating the assembly and electrically connected at its bottom to one of the polarizable electrodes, a metal cover for the metal casing, connected to the other electrode, and a sealing material interposed between and electrically insulating a periphery of the metal cover and the open edge of the metal casing and integrally caulked by an open edge of the metal casing, wherein the polarizable electrodes are composed of a continuously micro-porous structure of a fluorine-containing polymer resin with a fine carbon powder incorporated therein said fluorine-containing polymer resin being to 5 to 30% by weight relative to the fine carbon powder, wherein said structure comprises a numerous fine nodes of the resin and fine fibers of the resin three dimensionally connecting the nodes so that the nodes are partially in contact with or connected to one another, and the fine carbon powder is contained substantially in the nodes whereby said capacitor has a capacity of at least 40 F/cm$^3$.

2. The electric double layer capacitor according to claim 1, wherein the micro-porous structure is made of a polyatetrafluoroethylene resin having a maximum pore size not larger than 20 $\mu$m and a gas permeability of from 5 to 2000 by Gurley number.

3. The electric double layer capacitor according to claim 1, wherein the fine carbon powder is activated carbon, carbon black or a mixture thereof, which has a specific surface area of from 1000 to 3500 m$^2$/g.

4. The electric double layer capacitor according to claim 1, wherein the thickness of each polarizable electrode is within a range of from 0.2 to 1.5 mm.

5. The electric double layer capacitor according to claim 1, wherein the micro-porous structure is a sheet product formed by a process selected from the group of compression, extrusion, rolling or a combination thereof, followed by stretching.

* * * * *